June 17, 1958   H. N. FAIRBANKS ET AL   2,839,211
HAND CUTTER

Filed Feb. 14, 1956   2 Sheets-Sheet 1

HENRY N. FAIRBANKS
ORLA E. THAYER
INVENTORS

BY

,ATTORNEYS

June 17, 1958     H. N. FAIRBANKS ET AL     2,839,211

HAND CUTTER

Filed Feb. 14, 1956     2 Sheets-Sheet 2

HENRY N. FAIRBANKS
ORLA E. THAYER
INVENTORS

BY

ATTORNEYS

United States Patent Office 2,839,211
Patented June 17, 1958

2,839,211
HAND CUTTER

Henry N. Fairbanks and Orla E. Thayer, Rochester, N. Y., assignors to Eastman Kodak Company, Rochester, N. Y., a corporation of New Jersey Application February 14, 1956, Serial No. 565,503

8 Claims. (Cl. 216—29)

The present invention relates to photography, and more particularly to a device for cutting or chopping individual colored image areas or transparencies from a film strip, and feeding mounts into position to receive the transparencies.

As is well known, color film for roll film cameras comes in strip form, and the individual image areas or transparencies are spaced along the strip. After processing, these transparencies are normally separated or severed from the strip and placed in individual mounts usually formed from a cardboard sheet which is folded to provide a pair of overlapping flaps between which a transparency is sandwiched. These overlying flaps are provided with registered apertures which serve to frame the transparencies, all of which is well known to those in the art.

The present invention relates to a device by which the individual transparencies are severed from the strip, and the mounts are fed successively from a magazine into position to receive the severed transparencies.

The invention has as its principal object the provision of a new and improved cutting and mounting device for transparencies.

Still another object of the invention is the provision of a device of the class described which is hand operated, compact, rugged and simple in structure.

Yet another object of the invention is the provision of means for feeding and accurately positioning the individual mounts to receive the severed transparencies.

To these and other ends, the invention resides in certain improvements and combinations of parts, all as will be hereinafter more fully described, the novel features being pointed out in the claims at the end of the specification.

In the drawings.

Similar reference numerals throughout the various views indicate the same parts.

Figure 1:
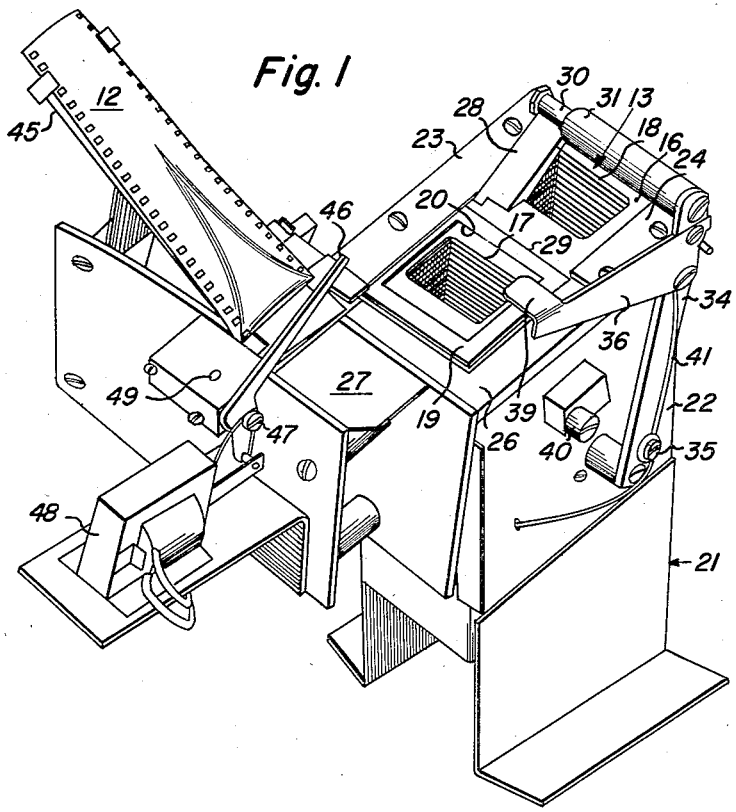
Fig. 1 is a perspective view of the cutting and mounting device of the present invention, with the mount feeding parts in their retracted or inoperative position.

The present invention relates to a device for separating individual colored image areas or transparencies 11 from a strip of film 12, and then mounting the severed transparency 11 on a mount which is, in the present instance, formed from a sheet of cardboard. As is well known, such cardboard sheets are scored along a center line to provide a pair of flaps 15 and 16 which, when folded, sandwiches the transparency 11 therebetween. The flaps are formed with apertures 17 and 18 which are in registering relation when the flaps are folded so as to frame the picture or the transparency, as is known to those in the art. One of the flaps, say flap 15, has adhesively secured thereto a hollow rectangular insert 19 which surrounds the aperture 17 in the flap 15 and has a center opening 20 which is of sufficient size to receive the severed transparency 11 in the manner well known in the art.

Figure 2:
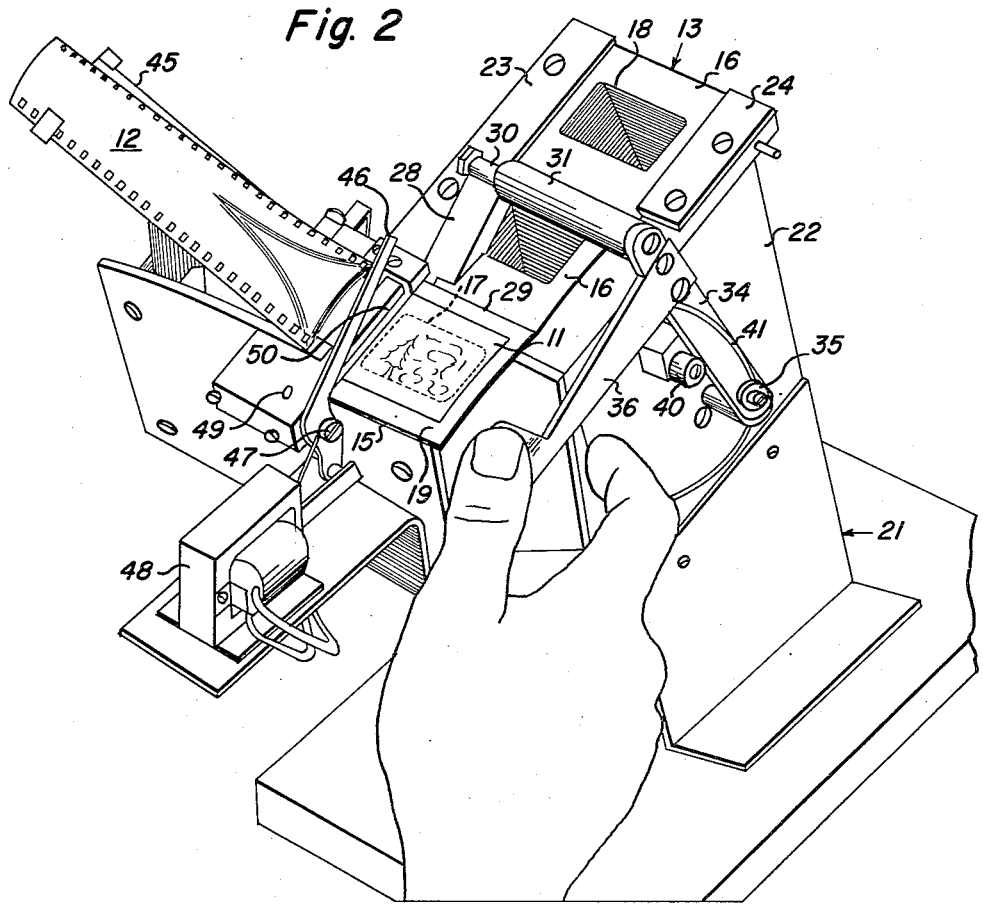
Fig. 2 is a view similar to Fig. 1, but showing the mount feeding means at the end of its feeding operation to position the mount in its transparency receiving position.

The device of the present invention comprises a base portion or support 21 which is provided with a mount magazine 22 in which the mounts 13 are stacked in open or flat relation, as shown in Figs. 1 and 2. The bottom of the stack of mounts rests on a spring support, not shown, which tends to urge the stack of mounts upwardly so as to position the top or uppermost mount in position to be engaged by a moving means, later described. Flat strips 23 and 24 overlie the top of the magazine and engage the upper surface or face of the top mount to limit the upward movement thereof and position the top mount for movement to a transparency receiving station, to be later described.

The top mount in the magazine is moved to the left, Figs. 1 and 2, from the magazine 22 and along a mount guide 26 to a transparency mounting station 27 where the mount is positioned below the transparency to receive the latter, as shown in Fig. 2. The uppermost or top mount in the magazine is moved to the mounting station by means of a small claw or pawl 28 which engages the rear or trailing edge 29 of the insert 19 as shown in Fig. 2, to move the mount from the position shown in Fig. 1 to the position illustrated in Fig. 2. This claw 28 is freely mounted on the left end on a rod 31 the right end of which is connected to the upper end of a vertical arm 34, the lower end of which is pivoted at 35 to the side of the magazine 22. Thus, the arm 34 is swingable about pivot 35 to move the rod 31 and claw 28 from the position shown in Fig. 1 to that shown in Fig. 2 to move the pawl 28 to engage the edge 29 of insert 19 and to then move the upper mount from the magazine 22 along the guide 26 to the mounting station 27, all of which is deemed apparent from inspection of Figs. 1 and 2. The arm 34 may be rocked in any suitable manner, but in the present embodiment, such movement is secured by means of a finger lever 36, one end of which is attached to arm 34 adjacent rod 31, and the other or free end is formed with a finger actuating member 39, which may be pressed downward, as illustrated in Fig. 2, to feed the mount. As the arm 34 moves downwardly to feed the mount, the arm 34 finally engages a stop 40 carried by the wall of the magazine 22 to limit further movement of the arm and hence the mount 13, to position the mount accurately at the mounting station 27 and in position to receive the severed transparency. To secure accurate positioning of the mount, the stop 40 is eccentrically mounted so that it may be rotated so as to adjust the downward movement of arm 34, the advantage of which will be deemed apparent. The arm 34, rod 31 and claw 28 are returned to the initial or starting position, Fig. 1, by means of a coil spring 41 which is wrapped around pivot 35 and has one end anchored to side of magazine 22, and the other end engaging arm 34 and mounted to rock the latter clockwise about the pivot 35 when the finger portion 36 is released, as is deemed apparent.

When the uppermost mount of the magazine has been fed to the mounting station 27, in the manner above described, the mount is then in position to receive the transparency which is severed from the film strip 12. The strip is fed downwardly along an inclined guide 45 either manually or by a suitable feeding means or pawl, not shown, and under a knife 46 pivoted at 47. The cutting action of the knife is controlled by a solenoid 48 and an operating button 49 connected into the circuit of the solenoid. This latter may be connected to a suitable electrical outlet, not shown. Since the solenoid and the control therefor can be of any suitable construction and form no part of the present invention, further details are not deemed necessary. Suffice it to say that the film strip is moved downwardly along the guide 45 and when a transparency or image area has been properly adjusted or framed relative to the knife anvil 50, the button 49 is pressed to energize solenoid 48 to pivot knife 46 to sever the transparency. When the transparency is severed, it is in position to fall in and to be seated in the opening 20 of insert 19. The mount 13 with transparency 11 positioned therein is then removed from the device, folded about its score line and placed in a suitable heating press, not shown, to adhere both flaps 15 and 16 to the insert 19 to seal the mount in a manner well known to those in the art.

Figure 3:
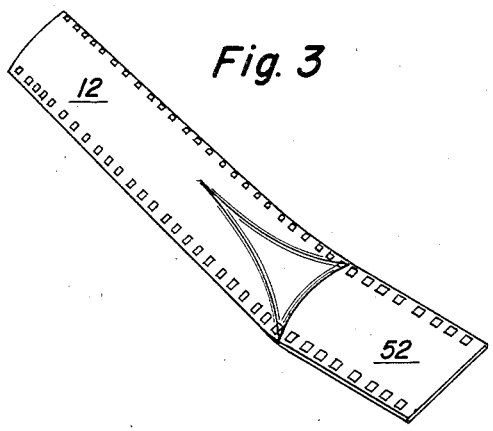
Fig. 3 is a portion of the film strip showing the straightening effect which results from the bending of the film at the cutting knife.

As is well known, strip colored film sometimes is bowed transversely, as shown in Figs. 1 and 2, and more clearly in Fig. 3. Because of such bowing, it is often difficult to get a good square cut across the film. In order to remedy this condition and to ensure the desired square cut, the film is fed downwardly along inclined guide 45 and a portion of the film to the right of knife is arranged horizontally or is bent out of the plane of film on the guide 45. This horizontal bending of the lower portion 52 of the film, as shown in Fig. 4, serves to straighten out the film transversely at the point of cut or at the anvil 50 so that as the knife cuts through the film a straight square cut is provided across the film.

Thus, the present invention provides a device in which a film is fed and cut to provide separate transparencies which are accurately positioned on a mount which is moved from a magazine and positioned below the severed transparency to receive the latter. The device is simple, easy to operate, rugged and highly effective in use.

While one embodiment of the invention has been described, it is to be understood that the inventive idea may be carried out in a number of ways. This application is, therefore, not to be limited to the precise details described, but is intended to cover all variations and modifications falling within the scope of the appended claims.

We claim:

1. In a film mounting device, the combination with a mounting station, a film guide along which a film strip is moved to position an image area of said strip in registry with said station, means to sever said positioned image area from said strip, a supply of mounts, a guide connecting said supply and said station and along which mounts may be moved individually into position at said station to receive the severed image area, a projection formed on the top surface of each mount, and means movable into engagement with said projection to move a mount along the mount guide to said station.

2. In a film mounting device, the embodiment with a mounting station, a film guide along which a film strip is moved to position an image area of said strip in registry with said station, means to sever said positioned image area from said strip, a supply of mounts, a guide connecting said supply and said station and along which mounts may be moved individually into position at said station to receive the severed image area, a projection formed on the top surface of each mount, and means movable along the surface of each mount and into engagement with said projection to move a mount along its guide and to said station.

3. In a film mounting device, the combination with a mounting station, a film guide along which a film strip is moved to position an image area of said strip in registry with said station, means to sever said positioned image area from said strip, a magazine in which a supply of mounts are arranged in opened relation, means to position the uppermost mount in said magazine, a mount guide connecting said magazine and said station and along which the uppermost mount is moved from said magazine to said station in position to receive the severed image area, an adhesive strip secured to the top surface of each mount and formed with an edge, and a reciprocating member slidable over the upper surface of the uppermost mount in said magazine and into engagement with said edge to move the top mount out of said magazine and along said mount guide and to said station in position to receive the severed image area.

4. In a film mounting device, the combination with a mounting station, a film guide along which a film strip is moved to position an image area of said strip in registry with said station, means to sever said positioned image area from said strip, a magazine in which a supply of mounts are arranged in opened relation, means to position the uppermost mount in said magazine, a mount guide connecting said magazine and said station and along which the uppermost mount is moved from said magazine to said station in position to receive the severed image area, an adhesive strip secured to the top surface of each mount and formed with an edge, a reciprocating member slidable over the upper surface of the uppermost mount in said magazine and into engagement with said edge to move the top mount out of said magazine and along said mount guide and to said station in position to receive the severed image area, and a manually controlled rocking member for moving said reciprocating member.

5. In a film mounting device, the combination with a mounting station, a film guide along which a film strip is moved to position an image area of said strip in registry with said station, means to sever said positioned image area from said strip, a supply of mounts, each mount comprising a strip of sheet material formed with an aperture with which the severed image area is to be registered, an insert surrounding said aperture and forming a seat to receive the image area, said mount having an edge which extends upwardly from the upper surface of the mount, a guide connecting said supply and said station and along which a mount is moved with the insert on the upper side of the mount, reciprocating means slidable along the upper surface of said mount and into engagement with said edge to move a mount from said supply to said station with the insert positioned to receive the severed image area which is positioned in registry with the mount aperture, and manual means to move said reciprocating means into engagement with said edge.

6. In a film mounting device, the combination with a mounting station, a film guide along which a film strip is moved to position an image area of said strip in registry with said station, means to sever said positioned image area from said strip, a supply of mounts, each mount comprising a strip of sheet material formed with an aperture with which the severed image area is to be registered, an insert surrounding said aperture and forming an edge which extends upwardly from the upper surface of the mount, means to position the uppermost mount in the plane of said station, a guide connecting said supply and said station and along which a mount is moved with the insert on the upper side of the mount, reciprocating means slidable along the upper surface of said mount and into engagement with said edge to move a mount from said supply to said station with the insert positioned to receive the severed image area which is positioned in registry with the mount aperture, and manual means to move said reciprocating means into engagement with said edge.

7. In a film mounting device, the combination with a mounting station, a film guide along which a film strip is moved to position an image area of said strip in registry with said station, means to sever said positioned image area from said strip, a magazine in which a stack of mounts are arranged, means to position the uppermost mount of said magazine substantially in the plane of said station, each mount being formed with an aperture for framing the severed image area, a hollow rectangular insert surrounding said aperture and secured to the upper surface of a mount to provide a seat to receive the severed image area, an edge of said insert extending above the upper surface of said mount, a mount guide connecting said magazine and said station and along which a mount is moved to said station to position said mount to receive the image area in said insert and in registry with said aperture, a reciprocating claw slidable over the upper surface of the top slide in said magazine and into engagement with said edge to move said mount along said mount guide to said station, manual means for moving said claw in one direction and into engagement with said edge, and spring means for retracting said claw.

8. In a film mounting device, the combination with a support, a mounting station on said support, a film guide on said support and along which a film strip may be moved to position an individual image area of said strip in position over said station, a magazine in which a supply of mounts is positioned, means associated with said magazine to position the top mount in said magazine in the plane of said station, each mount having an aperture for framing the severed image area, a hollow rectangular member secured to the upper surface of each mount and surrounding the aperture thereof to afford a seat to receive the severed image area, a mount guide connecting said magazine and said station and along which the mounts are moved into position at said station to receive the severed image area, said insert having an edge which projects above the upper surface of the mount, a reciprocating claw slidable over the upper surface of the top mount in the magazine and into engagement with said edge to move the top mount from said magazine to said station, means to limit the movement of said claw to position said mount at said station so as to bring said aperture and insert into registry with the severed image area, and means to reciprocate said claw.

References Cited in the file of this patent
UNITED STATES PATENTS

| | | |
|---|---|---|
| 2,555,218 | Bailey | May 29, 1951 |
| 2,666,543 | Standish | Jan. 19, 1954 |